United States Patent [19]

Pauls

[11] 4,120,128
[45] Oct. 17, 1978

[54] ARRANGEMENT FOR SECURING OBJECTS TO SUPPORT STRUCTURES WITH MULTI-COMPONENT HARDENABLE BINDER MATERIAL

[75] Inventor: Mathias Pauls, Lauterbach, Fed. Rep. of Germany

[73] Assignee: Artur Fischer Forschung, Tumlingen, Waldachtal, Fed. Rep. of Germany

[21] Appl. No.: 783,196

[22] Filed: Mar. 31, 1977

[30] Foreign Application Priority Data

Apr. 8, 1976 [DE] Fed. Rep. of Germany ....... 2615185

[51] Int. Cl.$^2$ ............................................. E04B 1/41
[52] U.S. Cl. .................................. 52/173 R; 52/704; 52/744; 222/94
[58] Field of Search .................... 52/173, 309.2, 309.5, 52/704, 744; 222/94, 95

[56] References Cited

U.S. PATENT DOCUMENTS

| | | | |
|---|---|---|---|
| 2,023,763 | 12/1935 | Hinz | 222/95 |
| 3,248,012 | 4/1966 | Adams | 222/95 |
| 3,543,966 | 12/1970 | Ryan et al. | 222/94 |
| 4,044,512 | 8/1977 | Fischer et al. | 52/704 X |

FOREIGN PATENT DOCUMENTS 411,700  5/1945  Italy ........................................ 222/94

Primary Examiner—Alfred C. Perham
Attorney, Agent, or Firm—Michael J. Striker

[57] ABSTRACT

A tubular anchoring member having an interior passage is inserted into an anchoring hole of a support structure. The anchoring member has transverse dimensions smaller than those of the anchoring hole so that a clearance is defined therewith. A ring-shaped cap member surrounds the anchoring member at a trailing end thereof, supports the anchoring member, and closes the open end of the clearance. An aperture formed in the anchoring member communicates the interior passage with the clearance. A guide sleeve is inserted into the interior passage until a closed leading end of the sleeve is located in the vicinity of the aperture. An open trailing end of the sleeve is connected to a collapsible envelope which is subdivided into a plurality of compartments, each containing a different component of a multi-component hardenable binder material. The compartments are brought into communication with each other and, in response to collapsing the envelope, the respective components are intermixed and advanced from the collapsible element through the interior of the guide sleeve to be introduced into the clearance via the aperture. The closed leading end of the guide sleeve is opened by either cutting off such leading end from the remainder of the sleeve or by bursting in response to forces generated during the collapse of the envelope. The intermixed components introduced in the clearance harden therein about the anchoring member and thereby anchor the latter in the anchoring hole.

10 Claims, 2 Drawing Figures

ARRANGEMENT FOR SECURING OBJECTS TO SUPPORT STRUCTURES WITH MULTI-COMPONENT HARDENABLE BINDER MATERIAL

BACKGROUND OF THE INVENTION

The present invention generally relates to a method and an arrangement for securing objects to support structures and, more particularly, to a method and arrangement for embedding an anchoring member in a body of multi-component hardenable cementing or other binder material.

It has been proposed to anchor an object to a support structure having an anchoring hole by inserting therein a tubular anchoring member which has a closed leading end and an open trailing end. An internal thread is provided at the open trailing end for threadingly receiving a screw operative for securing the object to the anchoring member, and, via the same, to the support structure.

The anchoring member has transverse dimensions so as to be receivable in an anchoring hole with radial clearance therefrom; and a ring-shaped cap member surrounds the trailing end portion of the anchoring member in the assembled condition, and has such dimensions as to center the anchoring member in the anchoring hole and to sealingly close the open end of the clearance existing between the inner surface of the anchoring hole and the outer surface of the anchoring member. The anchoring member is provided with an internal passage and at least one aperture in communication with the passage through which hardenable material can be introduced into the clearance existing in the anchoring hole.

The hardenable material is injected into the open trailing end of the anchoring member by an injection device. A guide sleeve is receivable in the interior passage and is connected to the injection device for guiding the hardenable material located in the injectin device into the clearance.

Although excellent results are obtained by using an injection device in applications requiring a multitude of objects to be mounted on support structures, the costs involved in using an injection device for mounting a few objects, and particularly a single object, to a support structure are prohibitive. Thus, it is not worthwhile or economically practical for a hobbyist, or a do-it-yourselfer, or any similar user who desires to secure a single or a few objects to a wall to resort to an expensive injection device.

SUMMARY OF THE INVENTION

Accordingly, it is an object of the present invention to improve the arrangements of the prior art.

More particularly, it is an object of the present invention to eliminate the necessity for using an expensive injection device for securing objects to support structures.

It is a concomitant object of the present invention to embed an anchoring member in a body of hardenable material in a simple, reliable and economical manner.

In keeping with these objects and others which will become apparent hereinafter, one feature of the present invention resides, in a method of and arrangement for securing an object to a support structure having an anchoring hole, briefly stated, in a combination which comprises an anchoring element having one part of transverse dimensions smaller than, and another part of transverse dimensions substantially corresponding to, those of the anchoring hole. The anchoring element is insertable into the anchoring hole through an open end thereof so that said other part supports the anchoring element at the open end of the anchoring hole with clearance between the latter and said one part, and closes the open end of said clearance upon insertion. The method and arrangement further comprises a collapsible envelope having an interior which is subdivided into a plurality of compartments each containing one component of a multi-component hardenable binder material. In order to introduce the components into the clearance for hardening therein, communication is first effected between the compartments, and the interior of the collapsible envelope is connected with the clearance by guide means which communicate the former with the latter. Upon collapse of the collapsible envelope, the components are intermixed and advanced from the interior of the envelope into the clearance via the guide means for hardening in the clearance about said one part of the anchoring element to thereby anchor the latter in the anchoring hole.

In a currently preferred embodiment of the present invention, the above-mentioned one part of the anchoring element is constituted by an anchoring member, and the other part of the anchoring element is constituted by a ring-shaped cap member which surrounds a portion of the anchoring member upon assembly therewith. The anchoring member is generally tubular and has a closed leading end and an open trailing end as viewed in the direction of introduction of the anchoring element into the anchoring hole. In this embodiment, the above-mentioned introducing means may include at least one aperture provided in the anchoring member and operative for passing of the hardenable material therethrough from the interior of the anchoring member into the clearance.

Preferably, the introducing means further comprises guide or shielding means which is insertable into the interior of the anchoring member through the open trailing end thereof to communicate with the above-mentioned aperture and operative for preventing the hardenable material from filling the interior of the anchoring member around the guide means. The anchoring member may have an internal thread at the trailing end thereof, the guide means then preventing the hardenable material from flowing towards and penetrating into the thread. According to a further concept of the present invention, the collapsible envelope is a thin-walled bag preferably constituted by resiliently yieldable synthetic plastic material. Each component which is located in a different separate compartment of the collapsible bag is inert by itself. However, when the various components are intermixed with each other, they interact and hardening ensues. The collapsible bag may be collapsed by urging opposite wall portions of the bag towards each other, e.g. by squeezing or clamping. The bag is emptied by collapsing successive wall portions lengthwise from one end towards the other end of the bag in the manner of emptying a toothpaste tube.

In accordance with still another concept of the present invention, the collapsible envelope is fixedly mounted to the above-mentioned guide means or sleeve member, and this sub-assembly is inserted as a unit into an interior passage of the anchoring member. The leading end of the sleeve member is closed when not in actual use in order to prevent drying out of the components in the collapsible envelope. During operation, the closed leading end of the sleeve member may be cut or snipped off; alternatively, the closed leading end of the sleeve member may be provided with weakened portions which break away from the sleeve member in response to pressure build-up generated during the collapse of the envelope.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DISCUSSION OF THE PREFERRED EMBODIMENT

Figure 1:
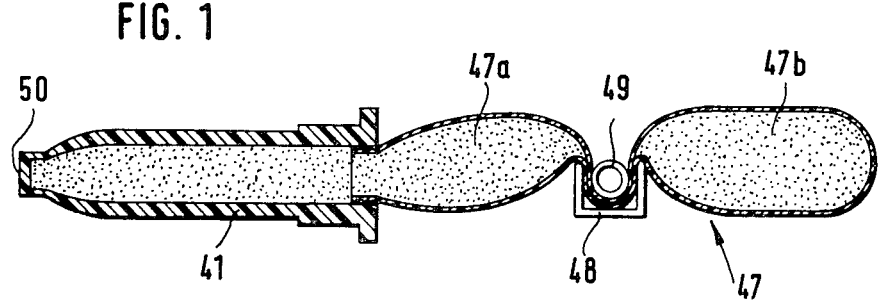
FIG. 1 is a sectional view of the sleeve member fixedly mounted to the collapsible envelope in non-operative or storage condition.

Referring now to the drawing in detail, FIG. 1 shows a sub-assembly of a sleeve member or guide means 41 fixedly connected, preferably by means of soldering, welding, gluing, bonding or like connections, to a collapsible envelope or bag 47. The bag 47 is preferably constituted by thin-walled, resiliently yieldable material such as synthetic plastic or metal. When not in use, the bag 47 is subdivided by urging means or clamping elements 48, 49 into a plurality of compartments each containing a different component of a multi-component hardenable binder material. In the illustrated embodiment, two compartments are shown each containing components 47a, 47b.

Components 47a and 47b remain inert so long as they are separated by the clamping elements 48, 49. Element 48 is a channel-shaped resiliently yieldable element bounding a recess in which opposite wall portions of the bag are receivable. Element 49 is a tubular resiliently yieldable member also receivable in this recess and operative for urging the opposite wall portions of the bag into frictional-tight engagement with each other. The transverse dimensions of member 49 are slightly larger than that of the recess so as to form a snap-type connection when the element 49 is fittingly received in element 48.

Component 47a communicates with an interior channel of sleeve 41 at one open end of the latter. The opposite end 50 is closed for preventing air from reaching the component 47a and drying the latter.

Figure 2:
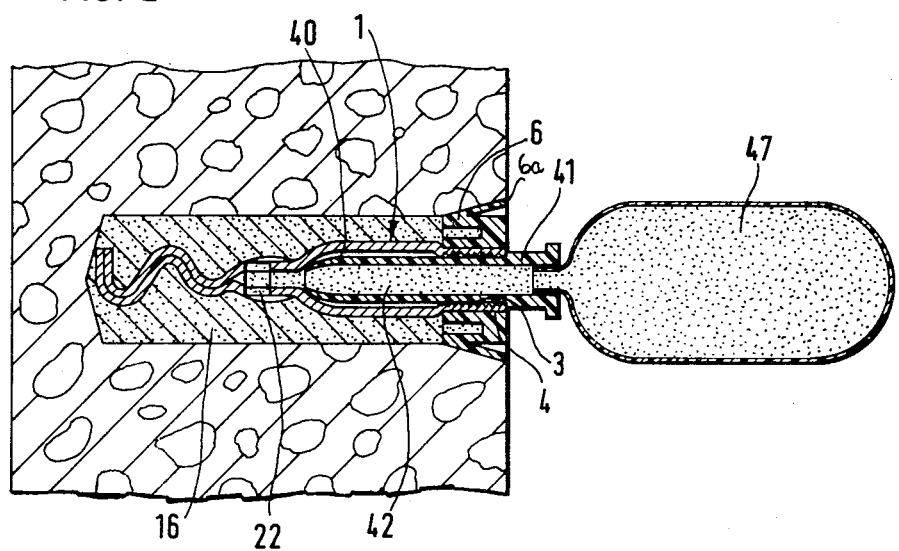
FIG. 2 is a partial view in vertical section showing the arrangement of FIG. 1 in operative condition.

FIG. 2 shows the sub-assembly of FIG. 1 in use. The sleeve 41 is inserted into an interior passage 40 of the anchoring member or dowel 1. The leading end of dowel 1 is closed, such as by squeezing, and includes several hook-shaped bends which improve the security with which the dowel 1 is held in an anchoring hole 16 of a support structure.

The trailing end of the dowel 1, as viewed in the direction of introduction of the anchoring member 1 into the anchoring hole 16, has a reduced diameter portion 4. An internal thread is provided at such reduced diameter portion 4 into which a screw is threaded to secure an object to the anchoring member 1 and thus to the support structure in which the anchoring hole 16 is provided. A ring-shaped cap member 6 is mounted on and surrounds the trailing end portion 4 and serves to close the open end of the clearance existing between the outer surface of the anchoring member 1 and the inner surface of the support structure which bounds the anchoring hole 16, when the anchoring element 1, 6 is introduced into the anchoring hole 16.

The outer diameter of the ring-shaped cap member 6 is selected to correspond the diameter of the anchoring hole 16 so that the cap member 6 is fittingly receivable in the open end of the hole 16. The ring-shaped cap member 6 is further provided with a sealing portion 6a which assures sealing of the above-mentioned clearance even when the open end of the anchoring hole 16 had been damaged during the drilling of the anchoring hole 16 or subsequently thereto.

The sleeve 41 is inserted into interior passage 40 until the leading end of sleeve 41 sealingly abuts against a reduced diameter section of the dowel 1. The dowel 1 also has an aperture 22 which communicates with interior passage 40 and with the clearance. The aperture 22 is located in the vicinity of the leading end 50 of sleeve 41.

In operation, the clamping element 49 is removed from element 48, thus effecting communication between the compartments in which components 47a and 47b are located. Then, bag 47 is collapsed, preferably by squeezing successive wall portions from the more remote end towards the closer end of the bag 47, as considered with reference to the support structure. The internal forces generated during the collapsing of bag 47 is transmitted via the components of the hardenable material directly to leading end 50. Eventually, the generated pressure is great enough to cause the leading end 50 to break away from the sleeve 41. Weakened portions or perforations may be provided at leading end 50 to facilitate this bursting effect. Alternatively, the leading end 50 can be cut-away prior to insertion into passage 40.

The components 47a and 47b are thereby mixed and advanced through the open end of sleeve 41, through the interior channel of sleeve 41, through the leading end 50, through the reduced diameter section of dowel 1, through aperture 22, and into the clearance which surrounds dowel 1.

After the hardenable material has hardened in the clearance, the sleeve 41 is removed from passage 40. The interior channel of sleeve 41 now contains a hardened core 42, thus making the sleeve unuseable. The sleeve 41 is essentially a very inexpensive article whose cost is negligible in comparison to that of the dowel 1. However, the function of the sleeve 41 has been served, i.e. to prevent the interior passage 40, and particularly the thread 3, from being filled with hardenable material. Upon removal of sleeve 41, the passage 40 and thread 3 are ready to receive a mounting screw.

The components 47a and 47b are preferably liquid constituents of a foamable synthetic plastics material.

It will be understood that each of the elements described above, or two or more together, may also find a useful application in other types of constructions differing from the types described above.

While the invention has been illustrated and described as embodied in a method and arrangement for securing objects to support structures with multi-component hardenable binder material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for securing an object to a support structure having an anchoring hole, comprising a sleeve-shaped anchoring element having one part of transverse dimensions smaller than, and another part of transverse dimensions substantially corresponding to those of the anchoring hole, said anchoring element being insertable into the anchoring hole through an open end thereof so that said other part supports said anchoring element at the open end of the anchoring hole with clearance between the latter and said one part and closes the open end of said clearance upon insertion, said anchoring element having an interior passage; and a closed collapsible container accommodating components of a multi-component hardenable binding material and having a first portion fittingly insertable into said interior passage of said anchoring element and a second portion remaining outside of said anchoring element upon such insertion of the same so that when said first portion of said container is inserted in said interior passage of said anchoring element and said second portion of said container is subjected to requisite collapsing force, the binding material is discharged from said container into said clearance to anchor said anchoring element in the anchoring hole, without thereby filling said interior passage of said anchoring element about said first portion of said container since such filling is prevented by the presence of said first portion.

2. The arrangement of claim 1, wherein said one part is constituted by an anchoring member, and said other part by a ring-shaped cap member surrounding a portion of said anchoring member upon assembly therewith.

3. The arrangement of claim 2, wherein said anchoring member is generally tubular and has a closed leading end and an open trailing end as viewed in the direction of introduction of said anchoring element into the anchoring hole; and further comprising means for introducing the binding material from said container into the said clearance, said introducing means including at least one aperture in said anchoring member for passage of said components therethrough into said clearance.

4. The arrangement of claim 1, wherein said second portion of said container is a collapsible envelope having an interior, means for subdividing said interior into a plurality of compartments each containing one of the components of the binding material, and means for effecting communication between said compartments for bringing said respective components into contact with each other.

5. The arrangement of claim 1, wherein said anchoring member has an internal thread at said trailing end thereof, and wherein said first portion of said container is operative for preventing said components from flowing towards and penetrating into said thread.

6. The arrangement of claim 4, wherein said collapsible envelope is constituted by thin-walled, yieldable material.

7. The arrangement of claim 4, wherein said subdividing means includes means for urging opposite wall portions of said collapsible envelope into contact with each other.

8. The arrangement of claim 7, wherein said urging means comprises a first clamping element having a recess in which said opposite wall portions are receivable, and a second clamping element receivable with snap-type action in said recess for urging said opposite wall portions into friction-tight engagement with each other.

9. The arrangement of claim 1, wherein said first portion of said container is a sleeve member of transverse dimensions corresponding to those of said interior passage of said anchoring element.

10. The arrangement of claim 9, wherein said sleeve member has closed leading end and an open trailing end as viewed in the direction of insertion of said sleeve member into said interior passage; and further comprising means for opening said closed leading end of said sleeve member.

* * * * *